May 4, 1943.  R. D. MOORE  2,318,411
CLAMP
Filed April 21, 1941  2 Sheets-Sheet 1
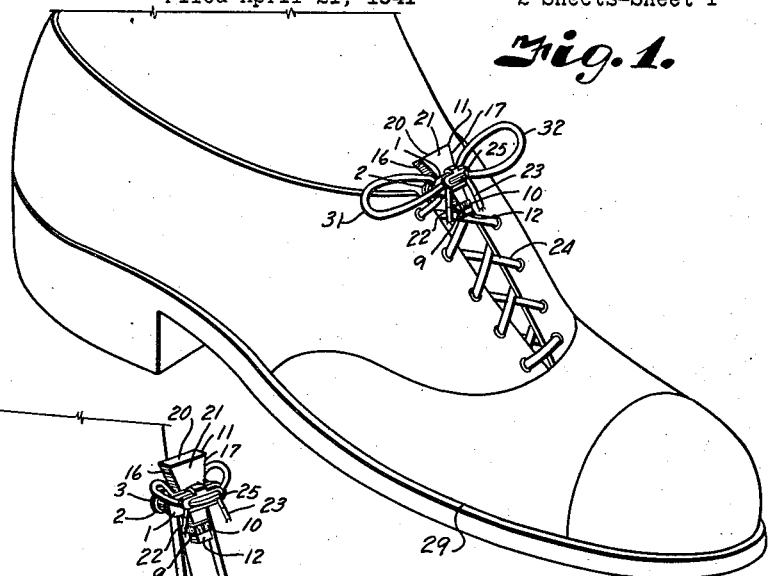
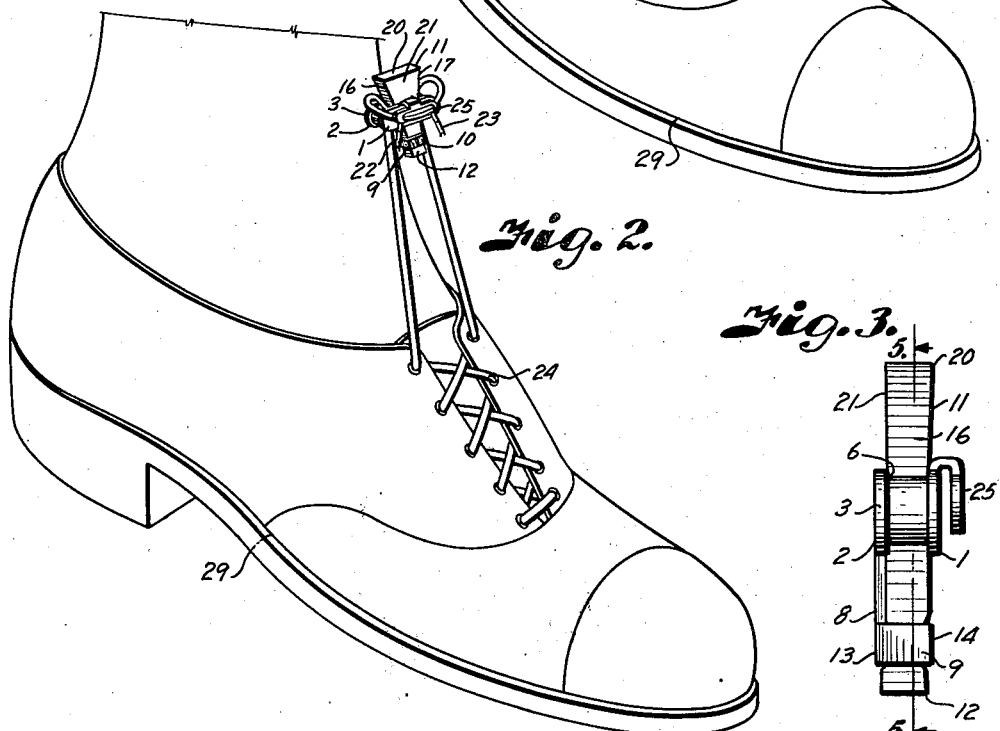
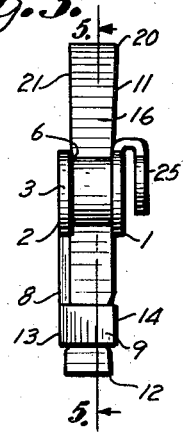
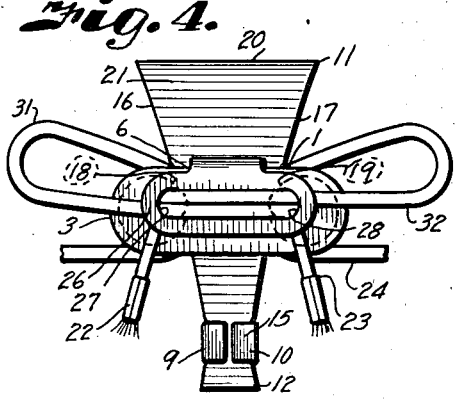
INVENTOR
Robert D. Moore.
BY
Arthur C. Brown
ATTORNEY May 4, 1943.  R. D. MOORE  2,318,411
CLAMP
Filed April 21, 1941  2 Sheets-Sheet 2
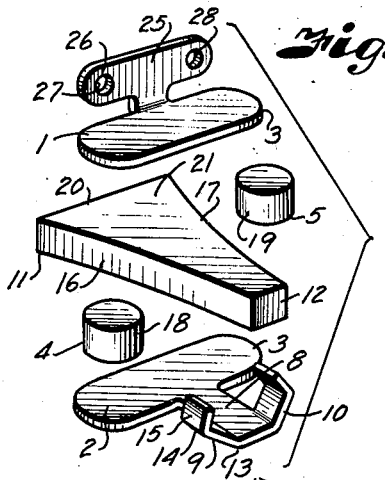
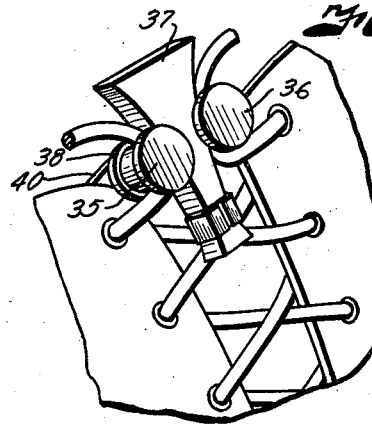
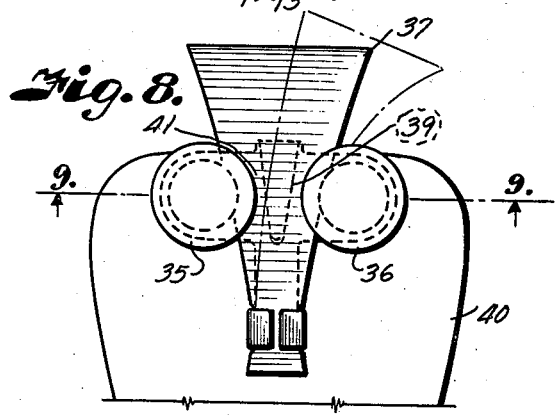
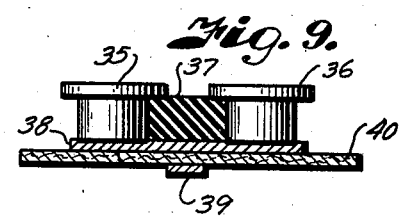
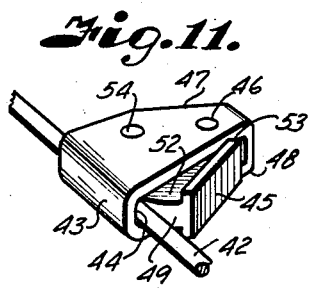
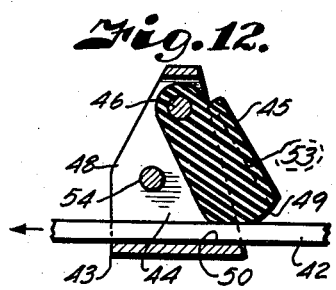
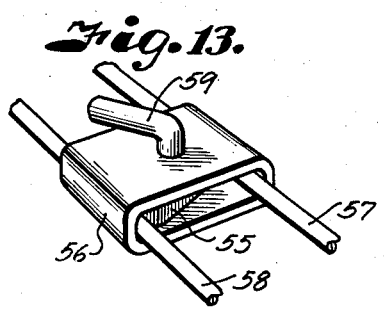
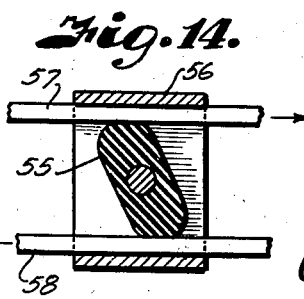
INVENTOR
Robert D. Moore.
BY Arthur C. Brown
ATTORNEY Patented May 4, 1943

2,318,411

UNITED STATES PATENT OFFICE 2,318,411

CLAMP

Robert D. Moore, Kansas City, Mo.

Application April 21, 1941, Serial No. 389,569

11 Claims. (Cl. 24—117)

This invention relates to clamps for fastening the ends of strands, such as shoe-laces, and has for its principal object to provide a device of this character which is of simple, inexpensive construction, readily manipulated, and which clamps securely the ends of the strands.

Other objects of the invention are to provide a device of this character which is neat in appearance and simulates an ordinary bow-knot.

In accomplishing these and other objects of the invention, as hereinafter pointed out, I have provided improved structure, the preferred forms of which are illustrated in the accompanying drawings, wherein:

Fig. 1 is a perspective view of a clamp embodying the features of the present invention and applied to the lace of a shoe, the clamp being shown in position to fasten the shoe-lace.

Fig. 2 is a perspective view similar to Fig. 1, but showing the clamp in position to loosen the laces for permitting removal of the shoe.

Fig. 3 is a side elevational view of the clamp.

Fig. 4 is a plan view of the clamp showing fastening of the ends of the shoe-lace.

Fig. 5 is a section through the clamp on the line 5—5, Fig. 3, and showing the ends of the lace in clamped position.

Fig. 6 is a detail perspective view of the parts of the clamp shown in disassembled spaced relation.

Fig. 7 is a perspective view of a modified form of clamp.

Fig. 8 is a plan view of the modified form of clamp shown in Fig. 7.

Fig. 9 is a cross-section on the line 9—9 of Fig. 8.

Fig. 10 is a side elevational view of the clamp shown in Fig. 7.

Fig. 11 is a perspective view of a further modified form of the invention.

Fig. 12 is a section through the form of invention shown in Fig. 11.

Fig. 13 is a further modified form.

Fig. 14 is a section through the modified form shown in Fig. 13.

Referring more in detail to the drawings:

In Figs. 1 to 6 inclusive is illustrated a preferred form of my invention which is adapted for securing a shoe-lace and includes a body member which may comprise elongated plate members 1 and 2 having rounded ends 3 and secured together by spacers 4 and 5. The spacers 4 and 5 are shown of cylindrical shape substantially conforming in diameter to the rounded ends 3. The plates are suitably attached to the spacers by spotwelding or equivalent fastening means to form a substantially loop-like body 6 having a passageway 7 closed at the top and bottom by the respective plates and at the ends by the spacers 4 and 5.

Extending from the plate 2, intermediate the length thereof and in aligning registry with the passageway 7, is an extension 8 having lateral clamping wings 9 and 10 spaced from the plate and adapted to anchor a wedge member 11 therebetween. The member 11 is formed of highly elastic and resilient material, such as rubber, and is of wedge or keystone shape. The member 11 is positioned in the passageway 7 and the smaller end 12 thereof overlies the extension 8 and is anchored thereto by the wings 9 and 10 which are bent upwardly, as at 13, to engage the sides of the wedge and then laterally, as at 14, to form terminals 15 which clampingly engage over the top of the wedge to clamp the wedge to the extension 8 and prevent displacement thereof from the passageway 7. The sides 16 and 17 of the wedge taper outwardly and rearwardly from the smaller end and closely engage the cylindrical faces or clamping portions 18 and 19 of the spacers 4 and 5 when the wedge is in relaxed condition. The wider end 20 projects a sufficient distance from the plate portion to form a finger gripping portion 21 whereby the wedge may be gripped between the fingers of a user and stretched retractively relatively to the clamped end thereof so as to effect elongation of the rubber and disengagement of the sides of the wedge from the clamping portions 18 and 19 of the spacers thereby opening passageways therebetween for the entrance of the ends 22 and 23 of a shoelace 24 therebetween and which are automatically clamped upon release of the wedge.

In order to give the appearance of a bow-knot, the rear edge of the plate 1 is provided with a T-shaped tongue 25, having lateral portions 26 provided with apertures or eyes 27 and 28. After the laces have been threaded between the sides of the wedge and the cylindrical surfaces of the spacers the end 22 of the lace is threaded through the eye 27 and thence through the eye 28 to leave a sufficient end for simulating the end of a bow-knot. The other end 23 of the lace is then threaded through the eye 27 and eye 28 in the opposite direction. The tongue 25 is then bent retractively over the top portion of the plate 1 to anchor the ends of the laces from displacement.

In applying the clamp to the lace 24 of a shoe 29, the shoe is laced in ordinary manner as shown in Fig. 1. The clamp is then held by the fingers of one hand while the fingers of the other hand engage the finger grip portion 20 of the wedge. The wedge is then elongated to effect lateral contraction thereof so that the ends of the lace may be threaded through the passageway 7 at the sides of the wedge. If desired, the gripped portion of the wedge may be shifted in a lateral direction so that one side is moved into engagement with the adjacent spacer while the lace is threaded at the opposite side. The wedge may then be shifted in the opposite direction to permit threading of the other end of the lace. The free ends of the lace are then passed through the eyes 27 and 28 and the tongue 26 is bent downwardly against the plate 1 to retain the loose ends thereagainst as shown in Fig. 1.

To tighten the lace in the shoe, the clamp is merely slid downwardly along the ends of the lace from the position shown in Fig. 2 to the position shown in Fig. 1. When the clamp is in the position shown in Fig. 1, the portions 31 and 32 of the lace form the loops of a knot and give sufficient slack when the clamp is loosened to permit removal of the shoe. To release the clamp, the gripping portion of the wedge is engaged between the thumb and finger of one hand and the clamp is drawn retractively to the position shown in Fig. 6. During this movement of the clamp the lace offers sufficient resistance to cause stretching of the resilient wedge and relief of pressure on the lace so that it slips readily between the sides of the wedge and the gripping faces of the spacers.

In the form of the invention shown in Fig. 7, the upper plate is omitted and the spacers 33 and 34 have flanged heads 35 and 36 overlying the upper face of the wedge 37, the wedge 37 being of identically the same construction as the wedge previously described. In this form of the invention the upper edge of the bottom plate 38 is provided with a prong 39 which is arranged to grip the tongue 40 of the shoe so that the clamp is securely fastened thereto. In applying the laces, the elastic wedge is shifted to the dot and dash line position shown in Fig. 8, while one end of the lace is passed through the space 41 which is opened adjacent the spacer 35. The wedge is then shifted in the opposite direction so that a similar opening is formed at the opposite side to permit passage of the other end of the lace. Upon release of the wedge the resilient action thereof effects a clamping action on the ends of the lace and prevents their retractive movement.

The form of the invention shown in Figs. 11 and 12 is designed for clamping a single strand, cord, or the like 42, and includes a loop-like body 43 having a pass 44 therethrough. Movable in the pass 44 is a resilient clamping member 45, which is pivotally mounted on a pin 46 extending therethrough and through the upper and lower plate portions 47 and 48 of the loop as shown in the drawings. The opposite end of the member 45 is rounded, as at 49, to cooperate with the inner face 50 of the loop-like body to clamp the ends of a strand 42 therebetween. To facilitate disengagement of the member 44 from clamping engagement with the strand, the side edge 52 thereof is provided with finger gripping flanges 53. The clamp may be secured in fixed position by a fastening device 54 extended therethrough.

The form of the invention shown in Figs. 13 and 14 is similar to the form illustrated in Figs. 11 and 12, except that the resilient wedging member 55 is arranged in the loop-like body 56 so that both ends cooperate with the ends of the loop to clamp the ends of strands 57 and 58 therebetween. In this form of the invention the wedging member is moved to and from wedging position by a lever 59 which forms the pivotal support therefor.

From the foregoing it is obvious that I have provided a clamp which is particularly suitable in securing the ends of strands, such as shoelaces and the like. It is obvious that the resilient wedge provides for ready release of the lace and forms a positive clamp means in clamping the ends of the lace when the wedge is in retracted position.

What I claim and desire to secure by Letters Patent is:

1. A clamp including, a body member having a clamping portion adapted to engage an object to be clamped and an elastic gripping member having a side cooperating with said clamping portion of the body member to clamp said object therebetween, means anchoring an end of the gripping member to the body member at a point spaced from the clamping portion to pass said object through said space, said elastic member being elongative when a pulling force is applied thereto and contractive transversely incidental to said elongation for opening a space between said side of the gripping member and the clamping portion of the body member to pass said object therethrough and said elastic member being returnable to its original shape when the pulling force is released for clamping said object between said side of the gripping member and said clamping portion of the body member.

2. A clamp including, a body member having laterally spaced clamping portions adapted to engage strands to be clamped, and an elastic member having an end portion anchored to the body member and having a portion extending between said clamping portions of the body member to cooperate therewith in clamping said strands, said elastic member being elongative when a pulling force is applied to the portion thereof extending between said clamping portions and contractible transversely at the point of the clamping portions to open spaces between said clamping portions and said elastic member being returnable to its original shape responsive to its elasticity when the pulling force is released.

3. A device of the character described including, plate members, means spacing said plate members to form a passageway therebetween, an elastic wedge extending through said passageway, and means on one of said plate members for anchoring the wedge to retain the wedge within said passageway for engaging ends of a strand projected between the spacing means and sides of said wedge.

4. A device of the character described including, plate members, spacers connecting ends of the plate members to form a passageway therebetween, an elastic wedge extending through said passageway, and means on one of said plate members for anchoring the small end of said wedge to engage the ends of a strand projected between the spacers and sides of said wedge.

5. A device of the character described including plate members, means spacing the plate members to form a passageway therebetween, an elastic wedge extending through said passageway, means on one of the plate members for anchoring the small end of said wedge to engage the ends of a strand projecting between the spacing means and sides of said wedge, and secondary means on one of the plate members for securing the ends of said strand.

6. A device of the character described including, plate members, means spacing the plate members to form a passageway therebetween, an elastic wedge extending through said passageway, means on one of said plate members for anchoring the small end of said wedge to engage the ends of a strand projected between the spacing means and sides of said wedge, and means on the other plate member for securing the ends of said strand.

7. A clamp including, a body member having laterally spaced clamping portions adapted to engage strands to be clamped, an elastic member having an end portion anchored to the body member and having a portion extending between said clamping portions of the body member to cooperate therewith in clamping said strands, said elastic member being elongative when a pulling force is applied to the portion thereof extending between said clamping portions and contractible transversely at the point of the clamping portions to open spaces between said clamping portions and said elastic member being returnable to its original shape responsive to its elasticity when the pulling force is released, and means on said body member for anchoring the free ends of said strands and arranged relatively to said clamping portions whereby slack in said ends simulate the loops of a bow-knot.

8. A clamp including, a body member having laterally spaced clamping portions, a resilient wedge having side edges cooperating with said clamping portions of the body member to clamp ends of a strand therebetween, and means anchoring the smaller end of said wedge to the body member in spaced relation with said clamping portions with the larger end of the wedge extending from the body member to form a gripping portion, said wedge being contractive intermediate said clamping portions when a pulling force is applied to the gripping portion for opening spaces between edges of said wedge and the clamping portions of the body member to pass the ends of the strand freely therebetween and said wedge being returnable to its original shape for effecting clamping pressure upon said ends of the strand when the pulling force is released.

9. A clamp including, a body member having laterally spaced clamping portions, a resilient wedge having side edges cooperating with said clamping portions of the body member to clamp ends of a strand therebetween, means anchoring the smaller end of said wedge to the body member in spaced relation with said clamping portions with the larger end of the wedge extending from the body member to form a gripping portion, said wedge being contractive intermediate said clamping portions when a pulling force is applied to the gripping portion for opening spaces between edges of said wedge and the clamping portions of the body member to pass the ends of the strand freely therebetween and said wedge being returnable to its original shape for effecting clamping pressure upon said ends of the strand when the pulling force is released, and means on the body member for attaching free ends of the strand and cooperating with said clamping portions whereby slack in said ends simulates the loops of a bow-knot.

10. A clamp including, a body member having laterally spaced clamping portions, a resilient wedge having side edges cooperating with said clamping portions of the body member to clamp ends of a strand therebetween, means anchoring the smaller end of said wedge to the body member in spaced relation with said clamping portions with the larger end of the wedge extending from the body member to form a gripping portion, said wedge being contractive intermediate said clamping portions when a pulling force is applied to the gripping portion for opening spaces between edges of said wedge and the clamping portions of the body member to pass the ends of the strand freely therebetween, said wedge being returnable to its original shape for effecting clamping pressure upon said ends of the strand when the pulling force is released, and means on the body member for attaching free ends of the strand and cooperating with said clamping portions whereby slack in said ends simulates the loops of a bow-knot, said loop portions being of sufficient length to allow sliding movement of the clamp on said strand when the pulling force is applied to said wedge.

11. A clamp including, a body member having laterally spaced clamping portions, a resilient wedge having side edges cooperating with said clamping portions of the body member to clamp ends of a strand therebetween, an extension on the body member, and means on the extension for anchoring the smaller end of said wedge to the body member in spaced relation with said clamping portions with the larger end of the wedge extending from the body member to form a gripping portion, said wedge being contractive intermediate said clamping portions when a pulling force is applied to the gripping portion for opening spaces between edges of said wedge and the clamping portions of the body member to pass the ends of the strand freely therebetween and said wedge being returnable to its original shape for effecting clamping pressure upon said ends of the strand when the pulling force is released.

ROBERT D. MOORE.